United States Patent
Armitage et al.

(10) Patent No.: US 7,174,715 B2
(45) Date of Patent: Feb. 13, 2007

(54) HOT TO COLD STEAM TRANSFORMER FOR TURBINE SYSTEMS

(75) Inventors: Pamela Kay Armitage, Orlando, FL (US); Erich Schmid, Marloffstein (DE)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

(21) Appl. No.: 11/049,242

(22) Filed: Feb. 2, 2005

(65) Prior Publication Data
US 2006/0168962 A1 Aug. 3, 2006

(51) Int. Cl.
*F01K 13/02* (2006.01)
(52) U.S. Cl. .............. 60/646; 60/659; 60/660
(58) Field of Classification Search .......... 60/646, 60/657, 653, 659, 660
See application file for complete search history.

(56) References Cited

U.S. PATENT DOCUMENTS

| | | | |
|---|---|---|---|
| 2,956,934 A * | 10/1960 | Waddill | 202/187 |
| 3,248,304 A * | 4/1966 | Goeldner | 202/160 |
| 3,259,111 A | 7/1966 | Koch | |
| 3,392,712 A | 7/1968 | Lustenader et al. | |
| 3,418,214 A * | 12/1968 | Cane | 202/176 |
| 3,496,724 A | 2/1970 | Wilson | |
| 3,640,250 A | 2/1972 | Costello et al. | |
| 3,882,680 A | 5/1975 | Durrant et al. | |
| 4,084,379 A * | 4/1978 | Schwartzman | 60/641.3 |
| 4,110,088 A * | 8/1978 | Cold et al. | 95/211 |
| 4,191,021 A * | 3/1980 | Nakamura et al. | 60/657 |
| 4,208,882 A | 6/1980 | Lopes et al. | |
| 4,277,943 A | 7/1981 | Silvestri, Jr. et al. | |
| 4,372,125 A | 2/1983 | Dickenson | |
| 4,455,836 A | 6/1984 | Binstock et al. | |
| 4,471,620 A | 9/1984 | Binstock et al. | |
| 4,487,166 A | 12/1984 | Haller et al. | |
| 4,558,227 A | 12/1985 | Yanada et al. | |
| 4,589,255 A | 5/1986 | Martens et al. | |
| 4,790,269 A | 12/1988 | Hamill et al. | |
| 4,873,827 A | 10/1989 | Hadano et al. | |
| 4,888,953 A | 12/1989 | Fukayama et al. | |
| 4,958,679 A * | 9/1990 | Drosdziok et al. | 165/288 |
| 5,018,356 A | 5/1991 | Silvestri, Jr. et al. | |
| 5,020,328 A * | 6/1991 | Bronicki | 60/641.5 |
| 5,176,723 A * | 1/1993 | Liu et al. | 95/216 |
| 5,622,632 A * | 4/1997 | Gallup | 210/669 |
| 5,850,739 A | 12/1998 | Masnoi | |
| 6,250,258 B1 | 6/2001 | Liebig | |
| 6,363,710 B1 | 4/2002 | Gebke et al. | |
| 6,422,022 B2 | 7/2002 | Gorman et al. | |
| 6,516,617 B1 | 2/2003 | Schwieger | |

* cited by examiner

*Primary Examiner*—Hoang Nguyen (57) ABSTRACT

A steam transformer (200) receives steam through a steam inlet (203), and the steam is mixed in a mixing zone (231) with water entering through a water inlet (205). Steam cooled by contact with the water exits the steam transformer through a cold steam outlet (216). Between the mixing zone (231) and the cold steam outlet (216) is positioned a demister (214) that restricts the passage of water droplets.

The steam transformer (200) is used to condition the steam temperature in steam turbine and combined cycle turbine facilities when adjustment of steam temperature is required, such as for cold starts of turbines. The steam transformer (200) may be installed into a bypass circuit or directly inline. A number of differing configurations and designs are disclosed.

19 Claims, 7 Drawing Sheets

HOT TO COLD STEAM TRANSFORMER FOR TURBINE SYSTEMS

FIELD OF THE INVENTION

This invention relates in general to the field of steam conditioning in turbine systems, and more particularly to systems comprising a steam transformer in which a flow of steam is cooled by exposure to water therein, as for starting cold turbines.

BACKGROUND OF THE INVENTION

Types of power generation facilities include gas turbine facilities, boiler or steam turbine facilities, and combined cycle turbine facilities (also known as gas and steam-turbine plants). Steam flows available in the latter two, steam-cycle types of facilities typically are directed, after some treatment to adjust temperature, for use in a number of operations including, but not limited to, cold starts, warm starts, shutdowns, control of process steam extraction, low load operations, and adjustment of steam temperature for industrial applications.

A cold start occurs when a turbine is started after a sufficient period of time that the temperature of its components have fallen below a specified temperature, such as when the low pressure rotor bore metal is below 200 degrees Fahrenheit. Cold starts are common in facilities that supply electrical power to residential grids. This is because power requirements there are diurnally cyclical and some turbine units are routinely shut down during low power requirement periods, and are restarted when demand increases. Even for other, non-residential or community-supplying power generation plants, cold starts, as well as warm starts, shutdowns, low load operations, and/or other operations needing steam temperature control may be required under various circumstances. Thus, proper regulatable control of steam temperature for such operations is generally needed.

Further regarding a cold start, a proper gradual warm up of a cold turbine allows for adequate treatment of steam seals in the turbine, gradually warms other turbine components, and thereby avoids steam turbine thermal cyclic damage. Because thermal stresses upon the metal components of steam turbines are known to adversely affect these components, leading to increased repairs and down time, and to shortened turbine life, various approaches are employed to assure a sufficiently gradual increase in steam temperature during turbine cold starts.

A common approach to providing steam at a gradually increasing temperature is to incorporate and utilize an in-line attemperator in a steam line from which steam is thereafter directed to enter, warm up, and start up a turbine. An in-line spray-nozzle type attemperator provides water through one or more nozzles or other apertures into the steam line. The water mixes with the steam, largely vaporizes, and thereby cools the main flow of steam in the steam line. Valves controlled by data from in-line temperature sensors control the relative flows of steam in the main steam line and water entering the main steam line at the attemperator. As the turbine begins to warm up, the relative proportions of steam and water are adjusted so as to supply, over a specified time frame, steam of gradually increasing temperature to the turbine.

However, it is known that there are limits to the amount of water that may be added through an in-line attemperator. Generally it is recognized that the upper limit for addition of water through an attemperator into a turbine steam line is about 15–18 percent of the steam flow for a common in-line attemperator. This may result in less flexibility during startups. A reason for this upper limit is that excessive water added through the attemperator may not vaporize completely. This lack of vaporization results in moisture carryover, where water droplets may travel into the turbine damaging the turbine blades. An example of an operational event where this may occur is the start up of a cold steam turbine with a gas turbine and waste heat recovery steam generator that have been operating at a high load temperature and pressure.

Attemperators of the spray-nozzle type and other types have been utilized in combined cycle turbine facilities. A combined cycle turbine facility generally includes a gas turbine plant, a waste heat recovery steam generator (i.e., HRSG, or boiler), and a steam turbine plant. Each gas turbine in the gas turbine plant is comprised of a gas turbine, an air compressor driven by the gas turbine, and a combustor. In a typical combined cycle system, a fuel/air mixture combusts in the combustor of the gas turbine, expanding to provide mechanical energy to rotate the gas turbine. Electricity is generated by a generator mechanically coupled to the shaft of the gas turbine. The hot gases of the combustion are directed into a waste heat recovery steam generator (i.e., boiler) where water is converted to steam based on energy transfer from the hot gases. This high pressure steam is then used to drive a high pressure steam turbine. The high pressure steam may have a pressure of about 1,000 to 1,500 pounds per square inch (psi), or in some cases up to 2,400 psi, and temperature may be in a range from about 1,000 to 1,050 degrees Fahrenheit. Typically steam at the end of the high pressure turbine then flows serially to drive turbines at lower pressures, such as to an intermediate pressure steam turbine and then to a low pressure steam turbine. The mechanical power from these turbines is converted to additional electricity via one or more generators connected to the turbines. In various designs the steam is reheated between passes through the respective steam turbines. For example, a reheater line in a combined cycle turbine facility may have a pressure between about 300 and 500 psi, and a temperature in a range of about 1,000 to 1,050 degrees Fahrenheit.

In some prior art steam attemperating systems of combined cycle systems, two steam flows having different temperatures are combined, their relative flows being controlled by valving, to provide a desired gradually increasing temperature for warming up a cold turbine. Alternatively, water from one of the condensers is used to cool one of the steam flows using an attemperator. One example of a steam-cooling-steam attemperation device is disclosed in U.S. Pat. No. 3,882,680, issued May 13, 1975 to Durrant and Haller ("the '680 patent). The invention in the '680 patent provides two steam attemperators, one downstream of a superheater outlet, and the other downstream of a reheat outlet. At each attemperator, valves control the inflow of two sources of steam, one cooler than the other. In one disclosed embodiment, there is a header extending laterally, substantially wider than tall, with a manifold extending through the middle of the space defined by the header. The manifold is supplied with lower temperature steam, which passes through spray holes directed downwardly. Higher temperature steam passes from one or more conduits at the bottom of the header, mixes with the lower temperature steam, and exits through a conduit at the top of the header. Appropriate adjustment of valving of the respective steam supplies is stated to provide for controlled and gradual increase in steam temperature for start-ups, controlled shutdowns, and the like.

Other patents that describe steam-cooling-steam approaches include U.S. Pat. No. 4,277,943, issued Jul. 14, 1981 to Silvestri and Kesavan, and U.S. Pat. No. 6,422,022 B2, issued Jul. 23, 2002 to Gorman et al. These patents, and, more generally, all patents, patent applications, patent publications, and all other publications cited herein are incorporated by reference to the same extent as if each individual publication or patent application was specifically and individually set forth in its entirety.

Examples of water being used to cool steam for attemperation include U.S. Pat. No. 3,392,712 issued Jul. 16, 1968 to Lustenader and May, U.S. Pat. No. 3,640,250 issued Feb. 8, 1972 to Costellos and Beckman, U.S. Pat. No. 4,208,882 issued Jun. 24, 1980 to Lopes and Carberg, U.S. Pat. No. 4,372,125 issued Feb. 8, 1983 to Dickenson, U.S. Pat. No. 4,455,836 issued Jun. 26, 1984 to Binstock et al., and U.S. Pat. No. 4,471,620 issued Sep. 18, 1984. An adaptive attemperator is described in U.S. Pat. No. 4,589,255 issued May 20, 1986 to Myers. This patent also provides detailed examples of the steps of cold and warm startups.

In view of the aforementioned limitations of currently used approaches for controlling steam temperature in steam-cycle types of turbine facilities, there is a need for improved systems and apparatuses for cooling steam for start-up of cold turbines and for other purposes.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

The present invention is directed to steam turbine facilities and combined cycle turbine facilities in which a flow of steam is cooled by exposure to water in a steam transformer. Thus, the present invention is directed to the entire respective turbine facilities, as well as to the subcomponent systems and apparatuses that are comprised of a steam transformer as defined and claimed herein.

As used herein, the term "steam-cycle power plant(s)" refers collectively both to steam (i.e., boiler) facilities, and combined cycle turbine facilities (also known as gas and steam-turbine plants). Within such steam-cycle power plants are present a number of distinct steam circuits that direct steam from one component (i.e., superheater, reheater) to another component (i.e., turbines) through conduits.

As used herein, the term "heater" refers to any heat-generating or heat-transfer component of a steam-cycle power plant, examples of which include a superheater, and a reheater, that is designed to elevate the temperature of the steam passing through it.

As used herein, the term "steam destination" refers to a component or end-use that receives steam, such as a turbine in a steam-cycle power plant, a heat exchanger or heating system in an industrial process facility, and an off-site heating system.

Further with regard to discussion of water and steam herein, particularly to the relative terms "hot steam," "cold steam," and "hot water," it is appreciated that the terms "hot" and "cold" are relative terms, and that the absolute temperatures for "hot steam," "cold steam," and "hot water" may vary widely depending on the particular system. In a particular embodiment under a particular set of operating parameters, "hot steam" does have a higher temperature than "cold steam," "hot water" and water.

Figure 1:
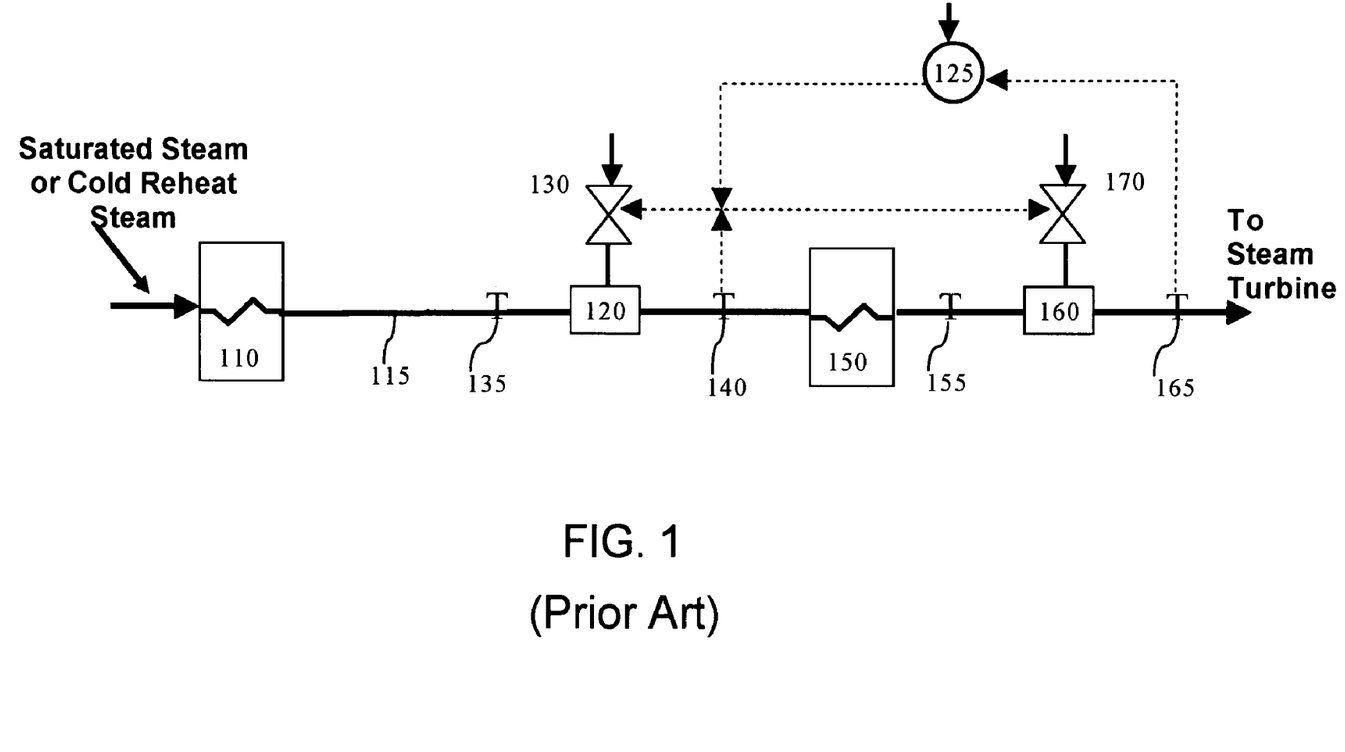
FIG. 1 provides a schematic diagram of a prior art arrangement of one section of a combined cycle turbine facility, including where two in-line attemperators are arranged in relation to a main steam line and two superheaters.

To better understand the present approaches to solving the problem of adjusting steam temperature for use in turbine facilities, FIG. 1 provides a schematic diagram of a prior art attemperator arrangement as found in a combined cycle turbine facility (only partially shown in FIG. 1). In operation, a first superheater 110 receives saturated steam and increases the steam temperature. This steam is then passed along a main conduit 115 along which is positioned a first attemperator 120. The first attemperator 120 receives water through valve 130 from a water source (indicated by the arrow above valve 130). First attemperator 120 is comprised of a single or of a multi-nozzle arrangement of apertures through which water from the water source is sprayed into main conduit 115 to mix with steam from first superheater 110. Also positioned along main conduit 115 are a first temperature sensor 135 positioned before or upstream of first attemperator 120 and a second temperature sensor 140 positioned downstream of first attemperator 120.

As can be seen in FIG. 1, downstream of the second temperature sensor 140 is a second superheater 150. Following that is a third temperature sensor 155, then a second attemperator 160, and finally the fourth temperature sensor 165. Thereafter, the steam travels to a steam turbine (not shown) for uses therein. It is noted that the letter "T" in this and other figures is meant to indicate the existence of a temperature sensor.

Various systems may be employed to provide feedback to the control valve 130 based on temperature readings, such as from both temperature sensors 140 and 165 (as indicated in FIG. 1), or from only temperature sensor 140, to regulate the steam temperature through use of the first attemperator 120. Similarly, data from one or more temperature sensors, such as 135, 140, 155, and 165, may be used to control the valve 170 that provides water to second attemperator 160 from the water source (indicated by the arrow above valve 170).

For example, during operation temperature data provided from the second temperature sensor 140 and from the fourth temperature sensor 165 goes to a controller 125 that controls the degree of opening of the two valves 130 and 170, which respectively control flow of water from the water source (indicated by arrows above valves 130 and 170) to the first attemperator 120 and to the second attemperator 160. Control logic may be set so that only the temperature data from the second temperature sensor 140 controls the valve adjustment of valve 130 which determines the water flow to the first attemperator 120. Likewise, temperature data from fourth temperature sensor 165 may only affect valve 170 supplying the second attemperator 160. Alternatively, data from both temperature sensors 140 and 165 may be utilized by controller 125 to determine flows to one or to both attemperators 120 and 160. One control option is to set the controller 125 to effectuate most of the steam temperature adjustment at the first attemperator 120, and to use the second attemperator 160 only when a minor cooling adjustment is needed (based on temperature data, for example, from temperature sensors 155 or 165).

Accordingly, using the prior art system shown in FIG. 1, steam is de-superheated by spraying feedwater into main conduit 115 at either one or both attemperator locations with single or multi-nozzle attemperator arrangements. The steam, thereby cooled, can then flow to and be utilized in the steam turbine for cold startups as appropriate to the particular need of the steam turbine.

As is recognized by those in the art, use of such in-line steam attemperators, where water is sprayed directly into the main steam conduit to cool the steam, introduces a risk of water droplets in the steam passing to the steam turbine. Such water induction to the steam turbine is known to damage components therein. Also, the attemperator parts themselves are subject to substantial thermal shock due to the large differences in temperature between the incoming steam and the cooling feedwater. Another limitation of traditional in-line attemperators is that the total amount of water that may be added for cooling the steam flow ratio is limited to a maximum of about fifteen to eighteen percent on a weight/weight basis. This limits the amount of cooling that a conventional in-line attemperator can achieve, and may make the initial steps of a cold start particularly difficult.

Figure 2A:
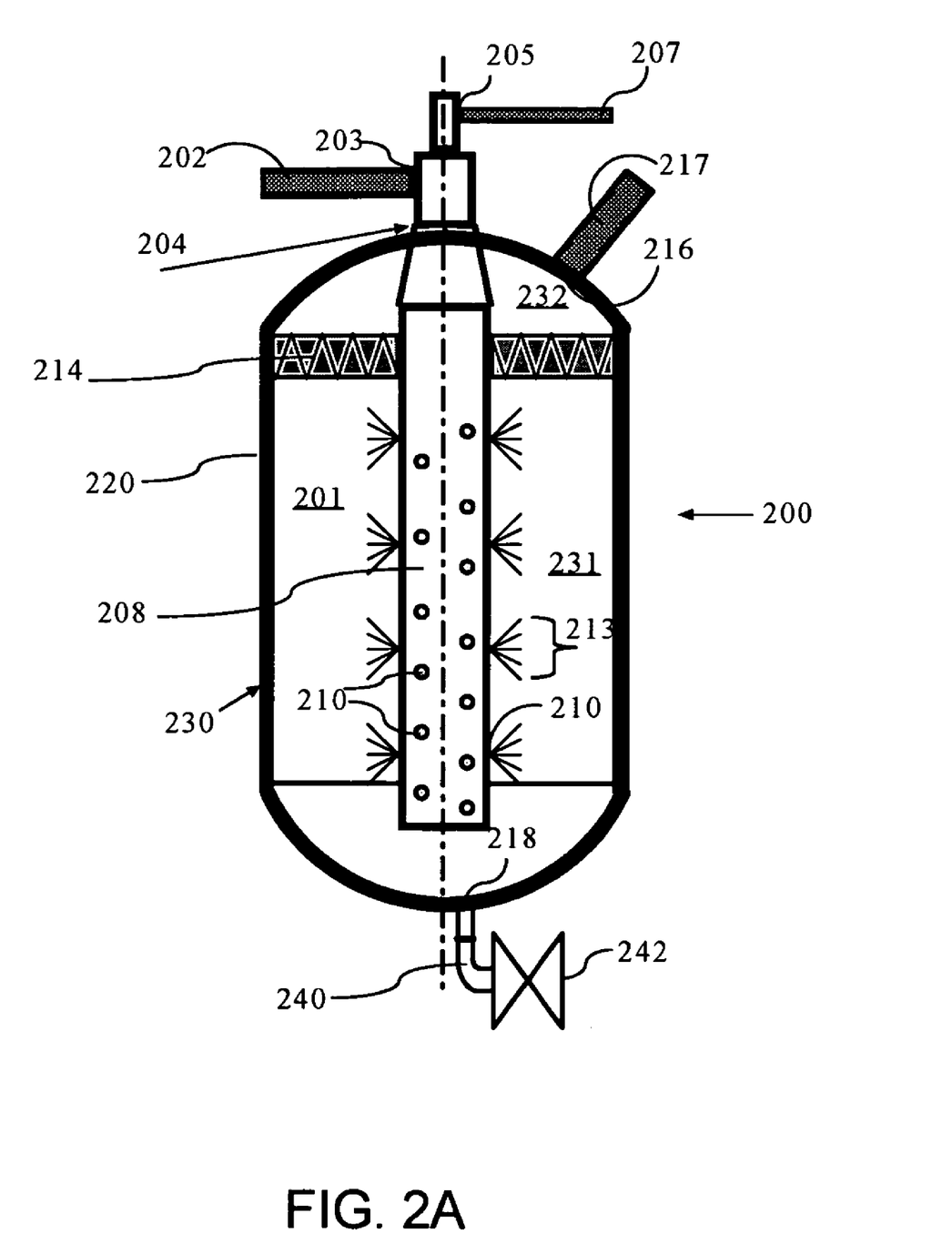
FIG. 2A provides a cross-sectional schematic diagram of one embodiment of the present invention, a spray type design of steam transformer.

FIG. 2A provides a side cutaway view of one steam transformer of the present invention that is used in the hot to cold steam transformer systems and apparatuses of the present invention. A steam transformer 200 as depicted in FIG. 2A comprises a pressure vessel 220 comprising walls 230 and having its height greater than its width, and its interior space 201 subdivided into a mixing zone 231, a demister 214 that defines a downstream end of the mixing zone 231, and a steam exit zone 232 downstream of the demister 214. The steam transformer 200 providing this subdivided, controlled interior space 201 receives hot steam from hot steam inlet conduit 202 through steam inlet 203. Steam passes though the steam inlet 203 into a water/steam mixing chamber 204 at the top of steam transformer 200 where water also enters, from a water inlet 205 (supplied by hot water inlet conduit 207). This design effectively extends the pressure boundary wall of the pressure vessel 220 beyond its walls 230.

The behavior of steam and water in the mixing chamber 204 is turbulent under normal operating conditions. After the water and steam mix in the water/steam mixing chamber 204, the water/steam mixture passes into perforated spray pipe 208. Perforated spray pipe 208 is positioned centrally within steam transformer 200, and is comprised of a plurality of apertures 210 (some shown in front view, others shown in side view). All such apertures 210 are positioned below demister 214, which presents a barrier across an upper plane of the interior of steam transformer 200. The apertures in certain embodiments may be round holes having a diameter between about one-quarter and one-half inch. Other types of apertures, such as nozzles, may alternatively be employed, for this and other styles of a steam transformer. As depicted in this and other figures, lines 213 radiating outwardly from such apertures 210 are meant to represent a spray or flow of steam and/or water.

Above this demister 214 is the cold steam outlet 216 fluidly communicating with cold steam conduit 217 through which cooled steam passes. A demister as used in the present invention, such as depicted in FIG. 2A as 214, may be a physical barrier comprising a fine mesh screen, or another physical barrier, such as mist eliminators comprising fibers or knitted meshes as are known in the art, that provides for passage of steam but that captures, by virtue of its mesh size and other characteristics, water droplets that may be entrained in the flow of steam. Accordingly, a demister barrier (such as 214) for this and other embodiments is effective to capture water droplets entrained in the steam flow, and water may, under certain conditions, drip from the demister. A demister, such as a screen mesh, that provides a physical barrier need not extend entirely across the controlled interior space to be effective as a demister. For example, a demister metal screen mesh may be installed to within 1–2 centimeters of the interior walls of the pressure vessel, thereby leaving a gap along its perimeter. This is nonetheless considered a demister providing a physical barrier as those terms are used herein, despite this barrier not being hermitic (although a hermitic demister physical barrier alternatively may be employed in certain embodiments). Further, it is noted that under superheated steam conditions, most or all of such water, whether retained by or dripped from the demister 214, evaporates to steam.

Figure 2B:
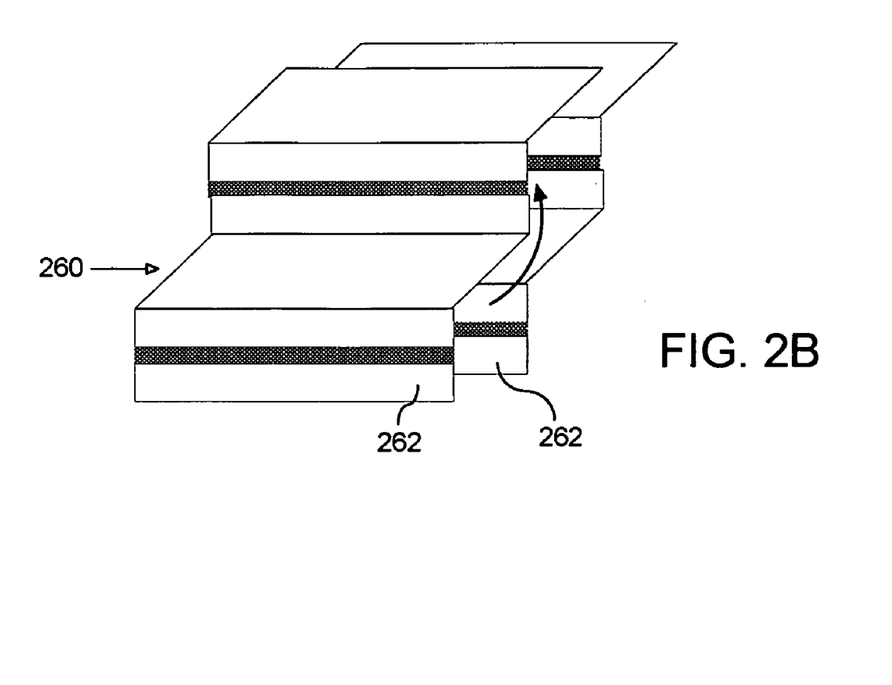
FIG. 2B provides an example of a section of a vane pack design of a demister.

Alternatively, a demister may be comprised of any droplet-separating structure within the steam transformer effective to separate water droplets from the flow of steam exiting at a cold steam outlet. For example, a demister vortex structure may be formed by appropriate blades or vanes that direct water droplets to an area of the interior walls of the pressure vessel 220 upstream of such demister structures, and the cold steam outlet may be placed centrally and displaced from the walls (such as in FIG. 3), so as to minimize intake of such water droplets. Another example is a filter vane separator demister. FIG. 2B provides a perspective view of one section of vane packs 260 of a filter vane separator demister that would be placed across the flow path of steam in the controlled interior space of a steam transformer. A steam flow comprising water droplets passes through the vanes 262 which are disposed at angles relative to the axis of a steam flow from the mixing zone to the steam exit zone. These angled vanes 262 force a number of changes in direction of the steam flow (indicated by arrow). These direction changes result in water droplets contacting the vanes 262. The physical mechanisms used in this approach are centrifugal force and/or inertial impaction and/or gravity and/or diffusional interception (the latter typically occurring only with very small aerosols, such as less than 0.1 um.). The water of the water droplets so contacting the vanes may re-evaporate or, alternatively, under certain conditions, may flow downward in the steam transformer. Embodiments of the filter vane separator demister comprise a plurality of vanes across an area of the interior space between the mixing zone and the steam exit zone, and arranged to force a number of changes of steam flow.

Figure 2C:
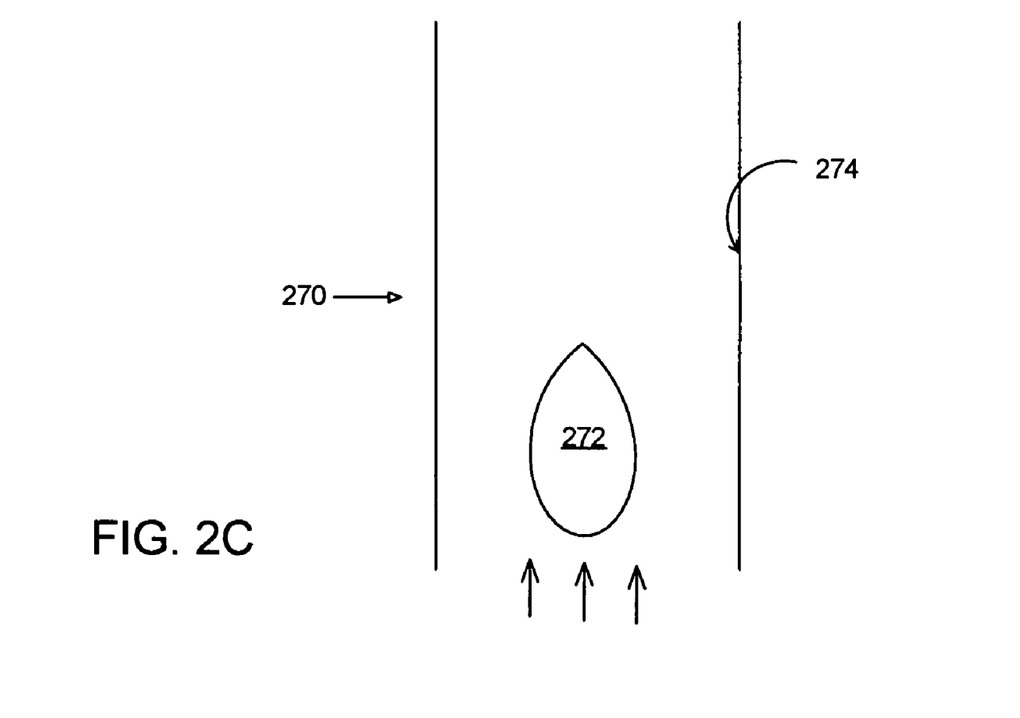
FIG. 2C provides an example of a functional unit of a cyclone design of a demister.

Another example is a demister comprised of one or more liquid/gas centrifugal separators that would be placed across the flow path of steam in the controlled interior space of a steam transformer. A functional unit 270 of one type of centrifugal separator demister is depicted in cross-sectional view in FIG. 2C. A stationary swirl element 272 imparts a rotation of the steam flow (indicated by arrows), and centrifugal force forces water droplets against the inner wall 274 of the centrifugal separator functional unit 270 (other forces, noted above, also may assist in this separation). The stationary swirl element, although disposed to impart a rotation of the steam flow within the passage, need not be positioned entirely within that passage. Also, there may be more than one stationary swirl element for each passage, and there may be a plurality of passages that comprise a demister. Although not depicted in FIG. 2C, in certain embodiments of centrifugal gas/liquid separators a secondary flow of gas is directed against the walls to purge and/or evaporate the droplets. However, this secondary flow feature is not required. It also is noted that liquid/gas coalescers, as are known in the art, may be employed for the demister, recognizing, however, that the higher cost and pressure drop of such systems may mean this is employed rarely.

As depicted in FIG. 2A, a drain hole 218 leads to a drain pipe 240. Flow from the interior space 201 of steam transformer 200 to this drain pipe 240 is controlled by valve 242, which normally remains closed during operation.

Functionally, this arrangement depicted in FIG. 2A provides for exposure and mixing of the incoming steam from hot steam inlet conduit 202 with hot water from hot water inlet conduit 207. This occurs under pressure and during a steam mass transfer flow through the steam transformer 200 which may, if not for the demister 214, entrain droplets of water into the exiting steam flow. As noted, the water droplets are captured by demister 214 (or, in some instances, some droplets are divided into smaller droplets), and the consequently drier steam flow passes to the steam exit zone 232 above demister 214.

Other specific arrangements of water and steam inlets into the pressure vessel, and of cooled steam exiting the pressure vessel may be implemented without departing from the scope of the present invention. For example, a steam inlet and a water inlet may be made separately into the sides of the steam transformer 200, below the plane of demister 214. Alternatively, a steam inlet and a water inlet may enter directly into mixing zone 231 through two concentric manifolds which are in fluid communication with a perforated spray pipe (so that there is no penetration of the demister 214). In such alternative designs, the perforated spray pipe may be oriented at any angle relative to the vertical axis of the steam transformer 200, and may be circular or another shape other than linear.

Figure 3:
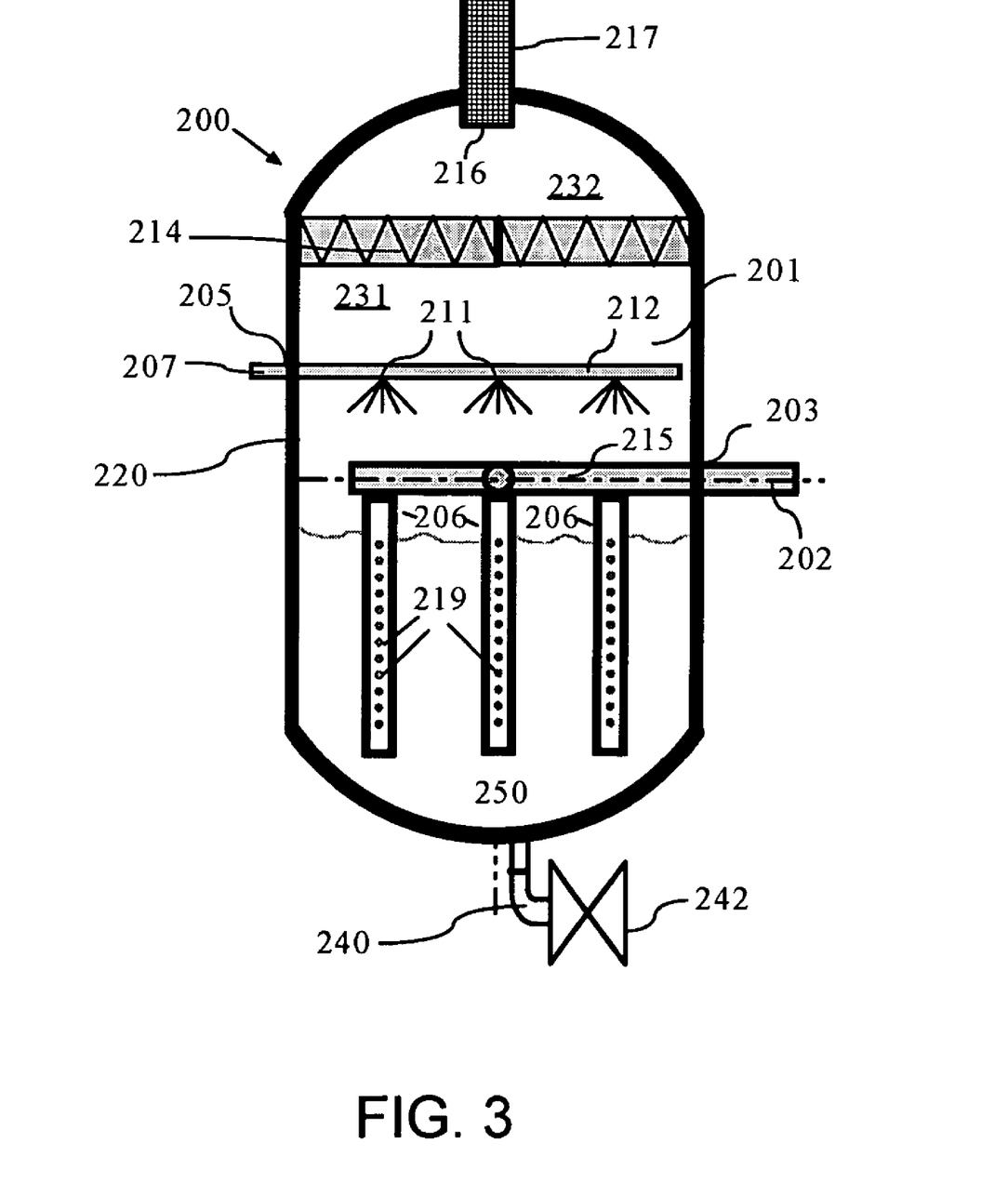
FIG. 3 provides a cross-sectional schematic diagram of one embodiment of the present invention, a sparger type design of steam transformer.

FIG. 3 presents a side cutaway view of a second style of steam transformer tank of the present invention. This is a sparger type design. A steam transformer 200 as depicted in FIG. 3 comprises a pressure vessel 220 having its height greater than its width, and its interior space 201 subdivided into a mixing zone 231, a demister 214 that defines a downstream end of the mixing zone 231, and a steam exit zone 232 above the demister 214. More specifically, a hot steam inlet conduit 202 enters the side of the vessel 220 at a central region of the vessel 220, at steam inlet 203. The hot steam thereafter passes through a horizontal manifold 215 from which are connected in fluid communication a plurality of perforated sparger pipes 206 each comprising a plurality of apertures 219. In FIG. 3, the perforated sparger pipes 206 are oriented in a downward direction from horizontal manifold 215. Hot water from hot water inlet conduit 207 enters the steam transformer 200 at water inlet 205, and passes through a horizontal conduit 212 from which it is distributed through nozzle-type or other type apertures 211. In FIG. 3, the horizontal conduit 212 is positioned above horizontal manifold 215; other arrangements may be designed and implemented based on selection of desired opening locations and configurations of conduits within the interior space 201.

In operation, hot water 250 maintains a water level above the apertures 219 in the perforated sparger pipes 206 so that the steam passes through the apertures 219 in the perforated sparger pipes 206 into the hot water 250, thereby effectuating a first cooling the steam. Then, when water is dripping from apertures 211, the steam flow may receive a second cooling as it passes through the non-water-filled part of mixing zone 231. Thereafter the steam flow passes through demister 214 and out of the steam transformer 200 through cold steam outlet 216 into steam outlet conduit 217.

It is appreciated that various modifications of the style depicted in FIG. 3 may be made while nonetheless remaining within the spirit and scope of the present invention. For instance, and not to be limiting, the hot steam inlet conduit 202 may enter through the side, near the bottom of the pressure vessel 220, or may enter from the bottom of the pressure vessel 220. In such embodiments, the perforated sparger pipes 206 would be directed upward from their connection with the horizontal manifold 215 that is in fluid communication with hot steam inlet conduit 202.

Figure 4:
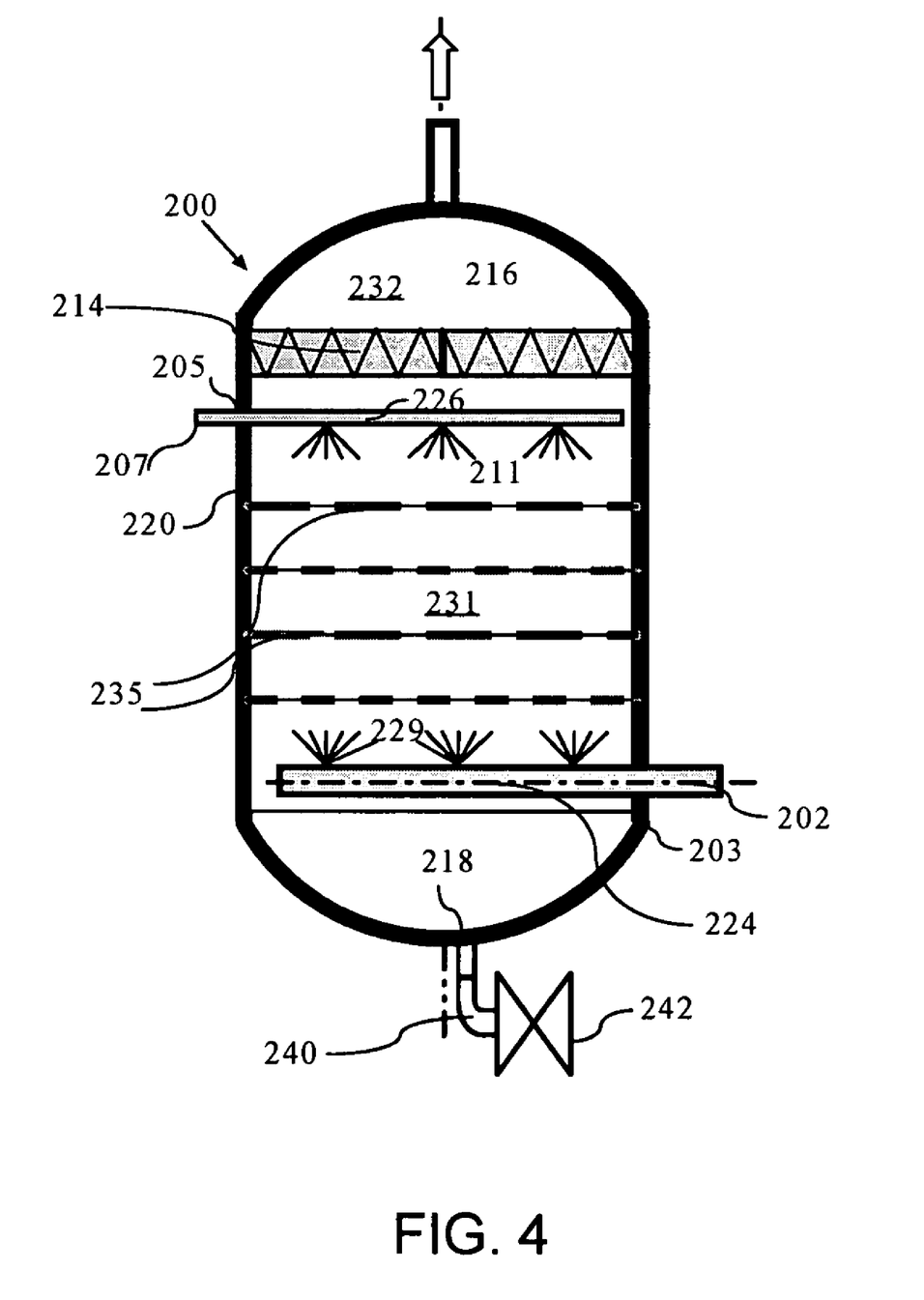
FIG. 4 provides a cross-sectional schematic diagram of one embodiment of the present invention, a tray type design of steam transformer.

A third style of steam transformer of the present invention is shown in FIG. 4, in a side cutaway view. In FIG. 4, a tray type style is depicted. A steam transformer 200 as depicted in FIG. 4 comprises a pressure vessel having its height greater than its width, and its interior space 201 subdivided into a mixing zone 231, its top end meeting a demister 214, and a steam exit zone 232 above the demister 214. Here there is a plurality of perforated trays 235 positioned horizontally in a central region of the steam transformer 200. Hot steam from hot steam inlet conduit 202 enters through steam inlet 203 near the bottom of steam transformer 200, and into steam manifold 224, and is distributed through hole-type or nozzle-type apertures 229 that are arranged along hot steam manifold 224. Positioned above the perforated trays 235 is a hot water manifold 226 receiving hot water from hot water inlet conduit 207, through water inlet 205, and distributing hot water downward through nozzle-type apertures 211. The hot water drips down onto the perforated trays 235 and is in contact with steam passing through the perforations of the trays 235 and occupying the space between the trays. As the steam passes upward by downward-flowing hot water in the trays, and as hot water drips down from tray to tray there is a heat transfer process (from the water and the trays) that cools the steam and warms the water, and that, under typical conditions, also vaporizes a portion of the hot water. Thus, there is an efficient heat transfer with this reverse-direction flow of water and steam based on the exemplified arrangement of elements.

Under standard operating conditions, the hot water enters the steam transformer and evaporates while in the steam transformer 200. However, under certain conditions water may accumulate at the bottom of steam transformer 200. Such water may be removed as needed through drain hole 218 into drain pipe 240 which may be regulated by a valve such as valve 242.

It should be appreciated that certain characteristics of the above examples are not meant to be limiting. Although the embodiments depicted in FIGS. 2, 3 and 4 have a positive verticality aspect, the height being greater than the width, the invention may be practiced with pressure vessels (round, square or other shapes), where this verticality aspect does not hold. However, without being bound to a particular theory, it is believed that a pressure vessel having a height greater than its width is more cost-effective to construct. This is believed due to a greater relative width, beyond a certain height/width ratio, requiring a thicker wall thickness, which would increase the overall project cost.

Figure 5:
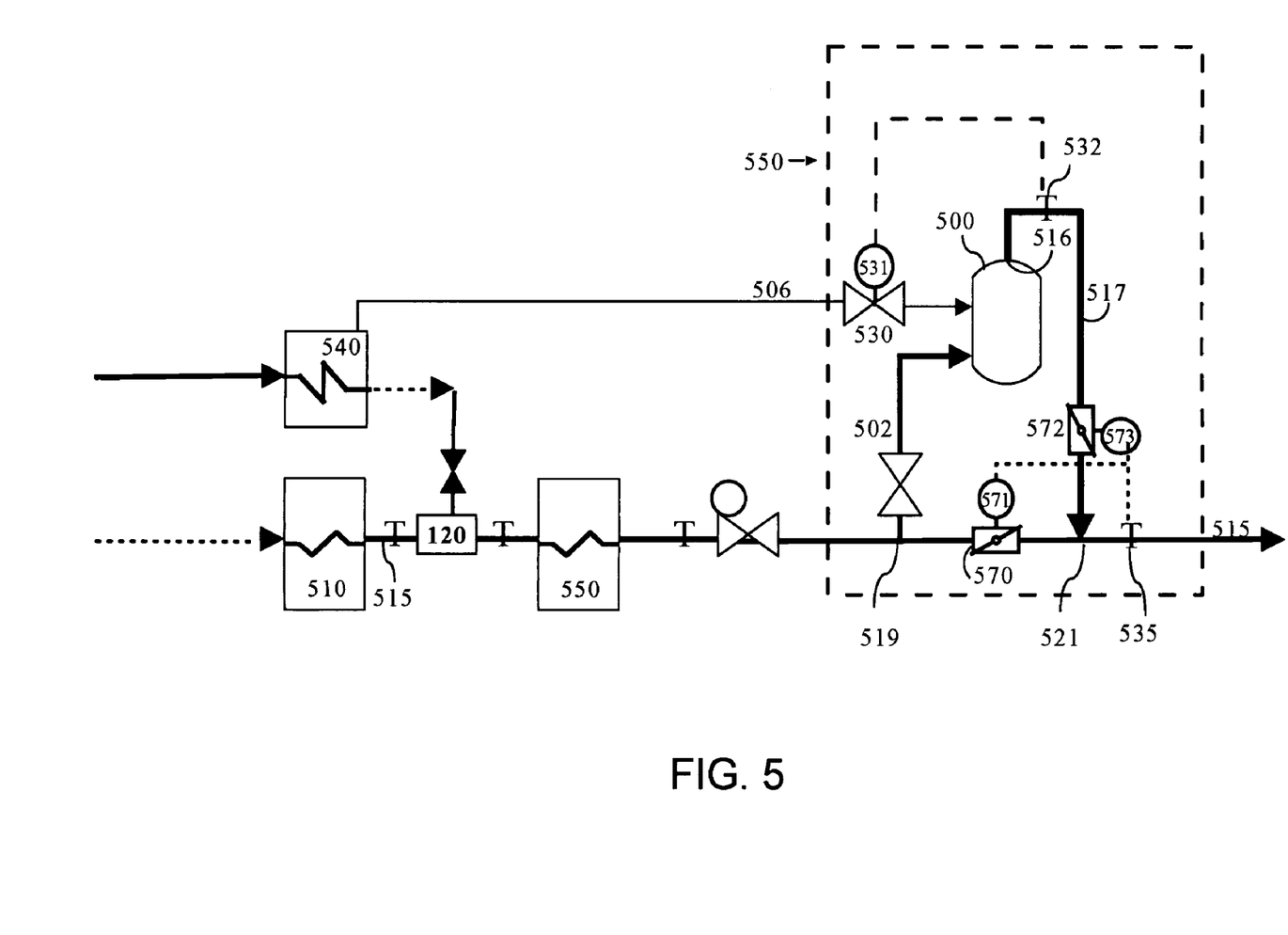
FIG. 5 provides a schematic diagram of an arrangement of one section of a combined cycle turbine facility, where an embodiment of the present invention is retrofit in a bypass relationship to a main steam line and two superheaters of a combined cycle turbine facility.

FIG. 5 exemplifies one embodiment of the hot to cold steam transformers of the present invention in a systems application. In FIG. 5, a steam conditioning system 550 of the present invention is shown enclosed within a dashed line, distinguishing it from other components of a combined cycle turbine power plant. In this embodiment a first superheater 510 receives high pressure saturated steam, superheats it, and passes it through main conduit 515 along which is a first attemperator 120 of the previous system. (It is noted that this attemperator may remain to control the outlet temperature of a second superheater below the design temperature limit of the steam system, , as indicated in FIG. 5 for retrofit facilities, whereas in new plant design there would be no attemperator in this position.) A second superheater 550 further increases steam temperature. Thereafter, the steam passes along main conduit 515 toward the steam turbine. At a point along main conduit 515 within the area of the steam conditioning system 500 (which as shown in FIG. 5 has been retrofit into a steam circuit of a combined cycle turbine facility) is a hot steam bypass conduit 502 that splits from the main steam line 515 at bypass point 519. This hot steam bypass conduit 502 passes to and enters steam transformer 500. Also entering steam transformer 500 is hot water through hot water inlet conduit 506. This hot water is supplied from a high pressure economizer 540 which receives its water from a feedwater pump (not shown).

It is noted that the sources of the steam and the water are selected so that the water pressure exceeds the steam pressure at the steam transformer without a need for supplemental increase in pressure for the water to enter the steam transformer. For example, when a superheater line supplies the steam and a high pressure economizer line supplies the water, the pressure of the water from the high pressure economizer exceeds the pressure of steam by about 100 pounds per square inch (psi). When a steam transformer is placed into a system supplied by a reheater and the water is supplied from the intermediate pressure economizer, the pressure of the water may exceed the steam pressure by about 300–400 psi The supply of the hot water through hot water inlet conduit 506 is regulated by valve 530. In the embodiment depicted in FIG. 5 the operation of valve 530 is controlled in part by temperature data coming from temperature sensor 532 positioned along cold steam outlet conduit 517. The data is processed by dedicated valve controller 531.

Cooled steam passes through cold steam outlet 516 past temperature sensor 532 through cold steam outlet conduit 517 and returns to the main conduit 515 farther downstream of the hot steam bypass conduit 502. A temperature sensor 535 is positioned further downstream along main conduit 515. Data from this temperature sensor 535 is fed back to controller 571 which regulates valve 570 in main conduit 515, controlling the main line of steam flow, and to controller 573 which regulates valve 572 in cold steam outlet conduit 517, controlling the flow of conditioned steam from the steam transformer 500 into the main conduit 515 at point 521. Appropriate regulation of these two valves 570 and 572 provide for attainment of a desired temperature, of steam to a steam turbine (not shown) such as during cold starts.

The discussion related to FIG. 5 involves the temperature adjustment of steam from superheater components of a waste heat recovery system in a combined cycle turbine facility. This is not meant to be limiting. For example, the same steam conditioning system 550 could have as its steam supply the reheater components of a combined cycle turbine facility. Also, the same steam conditioning system 550 could be employed in a steam turbine facility.

Figure 6:
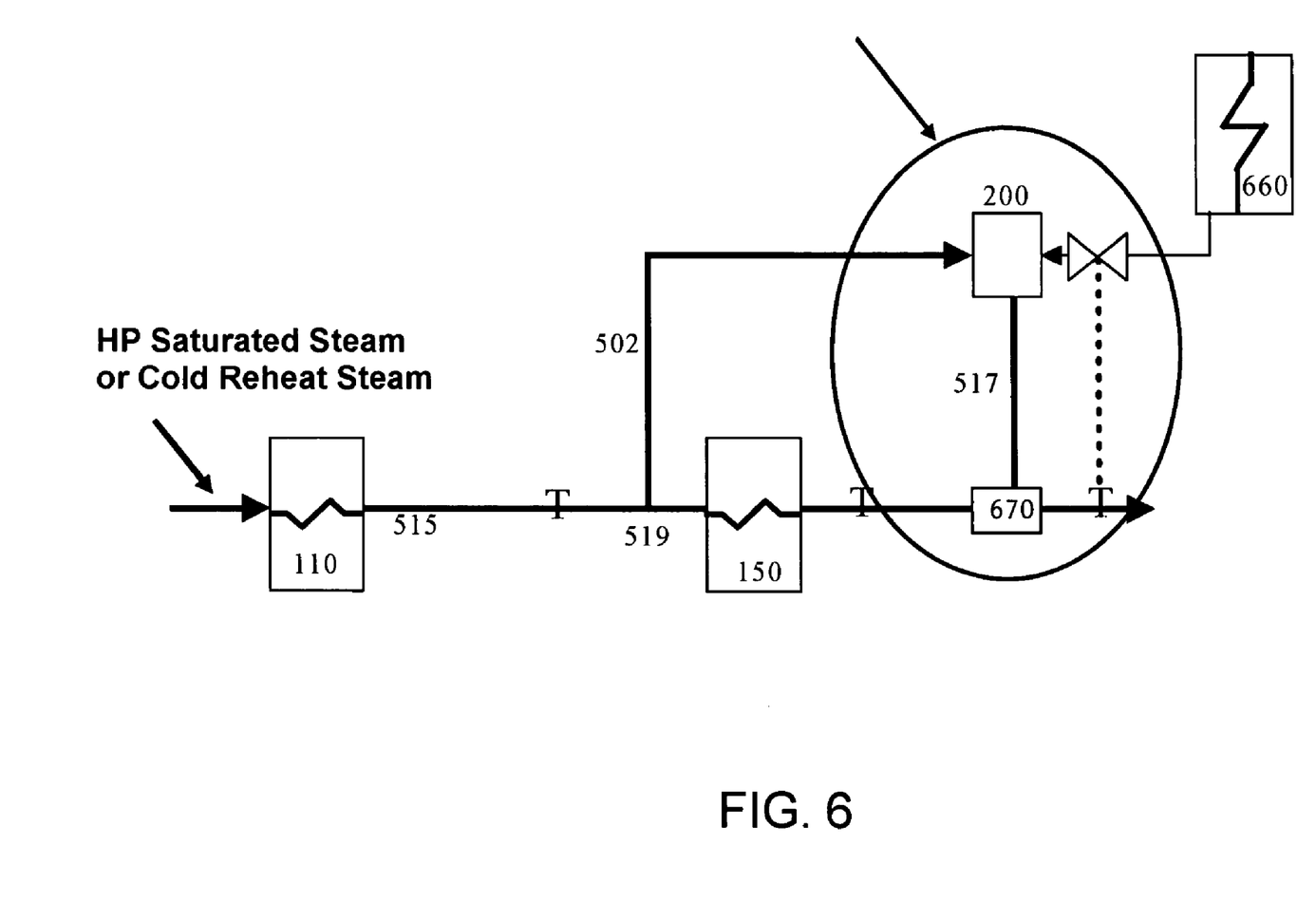
FIG. 6 provides a schematic diagram of major components of an arrangement of an embodiment of the present invention in a bypass relationship to a main steam line and two superheaters of a combined cycle turbine facility.

FIG. 6 is a schematic diagram that depicts another embodiment of the present invention. A bypass conduit 502 passes from a point 519 along main conduit 515 between the first superheater 110 and the second superheater 150. The bypass conduit is in fluid communication with a steam transformer 200, which may be of any style or design with regard to mixing of steam and water. Water is supplied to the steam transformer 200 from a high pressure economizer 660. Cooled steam exits from the steam transformer 200 and passes along conduit 517 to a steam mixing vessel 670, in which the cooled steam from the steam transformer 200 mixes with hotter steam from the second superheater 150. This mixed steam then continues downstream to a steam turbine or other end-use component or system.

Further, although the embodiments depicted in the figures and discussed above relate to steam transformers which are installed in bypass circuits from a main steam line, it is appreciated that a steam transformer of the present invention may in fact be installed into a main steam line. In such embodiments the steam in the main steam line would pass through the steam transformer vessel (rather than just a portion of steam that is bypassed as depicted in the figures). Without being bound to a particular theory, it is believed that such implementation would result in an overall pressure loss in the system, so that the cost-effectiveness of such implementation would need to be weighed against possible operational and other potential advantages.

It also is noted that modifications of the routing of conduits and control systems may be readily made by those skilled in the art without departing from the spirit and scope of the present invention. The present invention may be utilized in new installations, or retrofit into existing facilities.

It is appreciated that the embodiments disclosed above and in the figures are suitable for use and implementation in all types of steam-cycle turbine power plants, including steam (i.e., boiler) turbine facilities, and combined cycle turbine facilities (also known as gas and steam-turbine plants).

It is appreciated that variations in the size and interrelationship of the mixing zone, the steam exit zone, and the demister of the controlled interior space may be designed and implemented without departing from the scope and spirit of the present invention. As one example, the steam exit zone need not be large in volume relative to the mixing zone, and may be present as a small space surrounding a steam outlet (or a manifold leading to a steam outlet), in close or immediate proximity to the demister (which may, alternatively, be formed to surround a manifold leading to the steam outlet).

While the preferred embodiments of the present invention have been shown and described herein in the present context, such embodiments are provided by way of example only, and not of limitation. Numerous variations, changes and substitutions will occur to those skilled in the art without departing from the invention herein. For example, the present invention need not be limited to best mode disclosed herein, since other applications can equally benefit from the teachings of the present invention. Accordingly, it is intended that the invention be limited only by the spirit and scope of the appended claims.

We claim:
1. A steam-cycle power plant comprising:
 a. a steam source providing steam to a main conduit;
 b. a heater in fluid communication with the main conduit to elevate a temperature of the steam;
 c. a water source for providing water; and
 d. a steam conditioning system in fluid communication with the main conduit downstream of the heater; comprising:
  i. a pressure vessel defining a controlled interior space;
  ii. a mixing zone in the controlled interior space, in fluid communication with a steam inlet for receiving the steam from the main conduit and in fluid communication with a water inlet for receiving the water into the steam to produce cooled steam, wherein the mixing zone is adapted to provide for mixing of the steam and the water;
  iii. a steam exit zone in the controlled interior space, in fluid communication with the mixing zone to receive the cooled steam, and in fluid communication with a steam outlet for delivery of the cooled steam to a steam destination; and
  iv. a demister disposed in the controlled interior space in fluid communication between the mixing zone and the steam exit zone.

2. A steam-cycle power plant comprising:
 a. a steam source providing steam to a main conduit;
 b. a heater in fluid communication with the main conduit to elevate a temperature of the steam;
 c. a water source for providing water; and
 d. a steam conditioning system in fluid communication with the main conduit downstream of the heater, comprising:
  i. a pressure vessel defining a controlled interior space;
  ii. a mixing zone in the controlled interior space, in fluid communication with a steam inlet for receiving the steam from the main conduit and in fluid communication with a water inlet for receiving the water into the steam to produce cooled steam, wherein the mixing zone is adapted to provide for mixing of the steam and the water;
  iii a steam exit zone in the controlled interior space, in fluid communication with the mixing zone to receive the cooled steam, and in fluid communication with a steam outlet for delivery of the cooled steam to a steam destination; and
  iv. a demister disposed in the controlled interior space in fluid communication between the mixing zone and the steam exit zone, additionally comprising a bypass circuit bypassing a section of the main conduit, the steam conditioning system disposed along the bypass circuit.

3. The steam-cycle power plant of claim 2, additionally comprising a valve disposed in the bypassed section of the main conduit.

4. The steam-cycle power plant of claim 3, additionally comprising a control system to control the valve, to apportion a first portion of the steam to flow through the bypass circuit and a remaining portion of the steam to flow through the bypassed section.

5. The steam-cycle power plant of claim 4, the control system receiving temperature data from one or more temperature sensors positioned at locations selected from the group consisting of: along the main conduit downstream of the heater and upstream of the bypass circuit; along the bypassed section; along the main conduit downstream of the bypassed section; and along the bypass circuit downstream of the steam conditioning system.

6. The steam-cycle power plant of claim 1, the mixing zone comprising a perforated spray pipe comprising of a plurality of apertures for passage of the steam from the steam inlet and the water from the water inlet.

7. The steam-cycle power plant of claim 1, the mixing zone additionally comprising a manifold receiving the steam from the steam inlet and delivering the steam through a plurality of sparger pipes, each comprising a plurality of apertures disposed below a water level maintained in the mixing zone.

8. The steam-cycle power plant of claim 1, the mixing zone comprising a plurality of perforated trays providing a downward cascading flow of water, the water distributed from a manifold in fluid communication with the water inlet, and the steam inlet disposed to release steam below the plurality of perforated trays, so as to provide for reverse-direction flows of the water and of the steam.

9. The steam-cycle power plant of claim 2, the demister comprising a screen mesh forming a physical barrier between the mixing zone and the steam exit zone.

10. The steam-cycle power plant of claim 2, the demister selected from the group consisting of a filter vane separator demister and a centrifugal separator demister.

11. The steam-cycle power plant of claim 1, the steam destination comprising a cold turbine.

12. A steam circuit in a steam-cycle power plant, comprising
 a. a main conduit communicating steam between a steam source and a steam destination, and
 b. a bypass circuit in fluid communication with the main conduit, bypassing a section of the main conduit, further comprising a steam conditioning system comprising:
  i. a pressure vessel defining a controlled interior space;
  ii. a mixing zone in the controlled interior space, in fluid communication with a steam inlet for receiving a portion of the steam from the steam source, and in fluid communication with a water inlet for receiving the water into the steam to produce cooled steam, wherein the mixing zone is adapted to provide for mixing of the steam and the water;
  iii. a steam exit zone in the controlled interior space, in fluid communication with the mixing zone to receive the cooled steam, and in fluid communication with a steam outlet for delivery of the cooled steam to the steam destination; and
  iv. a demister disposed in the controlled interior space in fluid communication between the mixing zone and the steam exit zone.

13. The steam circuit of claim 12, additionally comprising a valve disposed in the bypassed section of the main conduit.

14. The steam circuit of claim 12, additionally comprising a control system to control the valve, to apportion a first portion of the steam to flow through the bypass circuit and a remaining portion of the steam to flow through the section.

15. The steam circuit of claim 12, the mixing zone comprising a perforated spray pipe comprising of a plurality of apertures for passage of the steam from the steam inlet and the water from the water inlet.

16. The steam circuit of claim 12, the mixing zone additionally comprising a manifold receiving the steam from the steam inlet and delivering the steam through a plurality of sparger pipes, each comprising a plurality of apertures disposed below a water level maintained in the mixing zone.

17. The steam circuit of claim 12, the mixing zone comprising a plurality of perforated trays providing a downward cascading flow of water, the water distributed from a manifold in fluid communication with the water inlet, and the steam inlet disposed to release steam below the plurality of perforated trays, so as to provide for reverse-direction flows of the water and of the steam.

18. The steam circuit of claim 12, the demister comprising a screen mesh forming a physical barrier between the mixing zone and the steam exit zone.

19. The steam circuit of claim 12, the demister selected from the group consisting of a filter vane separator demister and a centrifugal separator demister.

* * * * *